(12) United States Patent
Mitsuhashi (10) Patent No.: US 10,948,318 B2
(45) Date of Patent: Mar. 16, 2021

(54) ENCODER, HOLDING MEMBER, METHOD OF MOUNTING AN ENCODER, DRIVE APPARATUS, AND ROBOT APPARATUS, AND STAGE APPARATUS

(71) Applicant: NIKON CORPORATION, Tokyo (JP)

(72) Inventor: Yuichi Mitsuhashi, Tokyo (JP)

(73) Assignee: NIKON CORPORATION, Tokyo (JP)

( * ) Notice: Subject to any disclaimer, the term of this patent is extended or adjusted under 35 U.S.C. 154(b) by 975 days.

(21) Appl. No.: 15/460,618

(22) Filed: Mar. 16, 2017

(65) Prior Publication Data

US 2017/0184425 A1 Jun. 29, 2017

Related U.S. Application Data

(63) Continuation of application No. PCT/JP2015/077125, filed on Sep. 25, 2015.

(30) Foreign Application Priority Data

Sep. 30, 2014 (JP) .............................. JP2014-201351

(51) Int. Cl.
| | |
|---|---|
| *G01D 5/34* | (2006.01) |
| *G01D 5/347* | (2006.01) |
| *B25J 13/08* | (2006.01) |
| *G01D 5/244* | (2006.01) |
| *H02K 11/22* | (2016.01) |
| *B25J 9/12* | (2006.01) |
| *B25J 19/02* | (2006.01) |

(52) U.S. Cl.
CPC .......... *G01D 5/34707* (2013.01); *B25J 9/126* (2013.01); *B25J 13/088* (2013.01); *B25J 19/021* (2013.01); *G01D 5/24442* (2013.01); *G01D 5/3473* (2013.01); *H02K 11/22* (2016.01)

(58) Field of Classification Search
CPC ............ G01D 5/34707; G01D 5/24442; B25J 13/088; H02K 11/22
See application file for complete search history.

(56) References Cited

U.S. PATENT DOCUMENTS 6,642,508 B2 * 11/2003 Setbacken .......... G01D 5/34738
250/231.13

FOREIGN PATENT DOCUMENTS

| JP | 2000-025081 A | 1/2000 |
| JP | 2001-286101 A | 10/2001 |
| JP | 2003-42801 A | 2/2003 |

(Continued)

OTHER PUBLICATIONS

Apr. 4, 2017 Writtten Opinion issued in International Patent Application No. PCT/JP2015/077125.

(Continued)

*Primary Examiner* — Tony Ko
(74) *Attorney, Agent, or Firm* — Oliff PLC (57) ABSTRACT

An encoder, including: a scale that has a pattern and is mountable to a rotary member of an object to be measured; a main body including a detector that detects the pattern, the main body being mountable to a non-rotating portion of the object to be measured; and a holding member including: an abutment portion that is removably provided to the main body from outside the main body and passes through the main body to abut the scale; and a pushing portion that is capable of pushing the abutment portion toward the scale.

19 Claims, 9 Drawing Sheets

(56) References Cited

FOREIGN PATENT DOCUMENTS

| | | |
|---|---|---|
| JP | 2008-183716 A | 8/2008 |
| JP | 2012-220339 A | 11/2012 |
| WO | 2012/176911 A1 | 12/2012 |

OTHER PUBLICATIONS

Dec. 1, 2015 Search Report issued in International Patent Application No. PCT/JP2015/077125.

* cited by examiner

ENCODER, HOLDING MEMBER, METHOD OF MOUNTING AN ENCODER, DRIVE APPARATUS, AND ROBOT APPARATUS, AND STAGE APPARATUS

CROSS REFERENCE TO RELATED APPLICATION

This is a Continuation of PCT Application No. PCT/JP2015/077125, filed on Sep. 25, 2015. The contents of the above-mentioned application are incorporated herein by reference.

FIELD OF THE INVENTION

The present invention relates to an encoder, a holding member, a method of mounting an encoder, a drive apparatus, and a robot apparatus.

BACKGROUND

An encoder is a known example of a device for detecting the number of rotations and the rotation angle of a rotary member such as a shaft member of a motor (see, for example, Patent Literature 1). For use, the encoder is mounted to a motor (object to be measured), for example. An exemplary encoder is configured such that a scale having a predetermined pattern such as a light reflection pattern or a magnetic pattern is rotated integrally with a rotary member, and a detector is used to irradiate the light reflection pattern with light and read reflected light and detect a change in the magnetic pattern, for example, thereby detecting the number of rotations and the rotation angle of a rotation shaft of a motor.

Mounting such an encoder involves fixing the detector to a non-rotating portion (such as motor main body) of the motor, thereafter fitting the scale and the rotary member (such as shaft member) together, and fixing the scale and the rotary member together by using a fixation member such as a screw.

CITATION LIST

Patent Literature

[Patent Literature 1] Japanese Unexamined Patent Application Publication No. 2000-25081

In the case where the shaft member is arranged lower than the motor main body in the direction of gravity, however, the scale may fall off from the rotary member after the scale and the rotary member are fitted together. It may thus be difficult to mount the encoder depending on the posture of the motor.

It is an object of the present invention to provide an encoder, a holding member, a method of mounting an encoder, a drive apparatus, and a robot apparatus capable of mounting the encoder irrespective of the posture of a motor.

SUMMARY

A first aspect of the present invention provides an encoder, including: a scale that has a pattern and is mountable to a rotary member of an object to be measured; a main body including a detector that detects the pattern, the main body being mountable to a non-rotating portion of the object to be measured; and a holding member including: an abutment portion that is removably provided to the main body from outside the main body and passes through the main body to abut the scale; and a pushing portion that is capable of pushing the abutment portion toward the scale.

A second aspect of the present invention provides a holding member to be used to mount an encoder that includes: a scale that has a pattern and is mountable to a rotary member of an object to be measured; and a main body including a detector that detects the pattern, the main body being mountable to a non-rotating portion of the object to be measured, the holding member including: an abutment portion that is removably provided to the main body from outside the main body and passes through the main body to abut the scale; and a pushing portion that is capable of pushing the abutment portion toward the scale.

A third aspect of the present invention provides a method of mounting an encoder that includes: a scale having a pattern; and a main body including a detector that detects the pattern, the method including: a first fixation step for fixing the main body to a non-rotating portion of an object to be measured by using a first fixation member; an adjustment step for adjusting a position of the scale in a rotation direction with respect to a rotary member of the object to be measured, in a state in which a holding member including an abutment portion that abuts the scale and a pushing portion capable of pushing the abutment portion toward the scale is mounted to the main body from outside the main body; and a second fixation step for fixing, after the rotation position is adjusted, the scale to the rotary member by using a second fixation member in a state in which the scale portion is held by the abutment portion by the pushing portion.

A fourth aspect of the present invention provides a drive apparatus, including: a rotary member; a driver that rotates the rotary member; and an encoder that is fixed to the rotary member and detects positional information of the rotary member, wherein the encoder is the encoder in the first aspect.

A fifth aspect of the present invention provides a robot apparatus, including: a rotating body; and a drive apparatus that rotates the rotating body, wherein the drive apparatus is the drive apparatus in the fourth aspect.

DETAILED DESCRIPTION OF EMBODIMENTS

Referring to the accompanying drawings, embodiments of the present invention are described below.

Encoder

Figure 1:
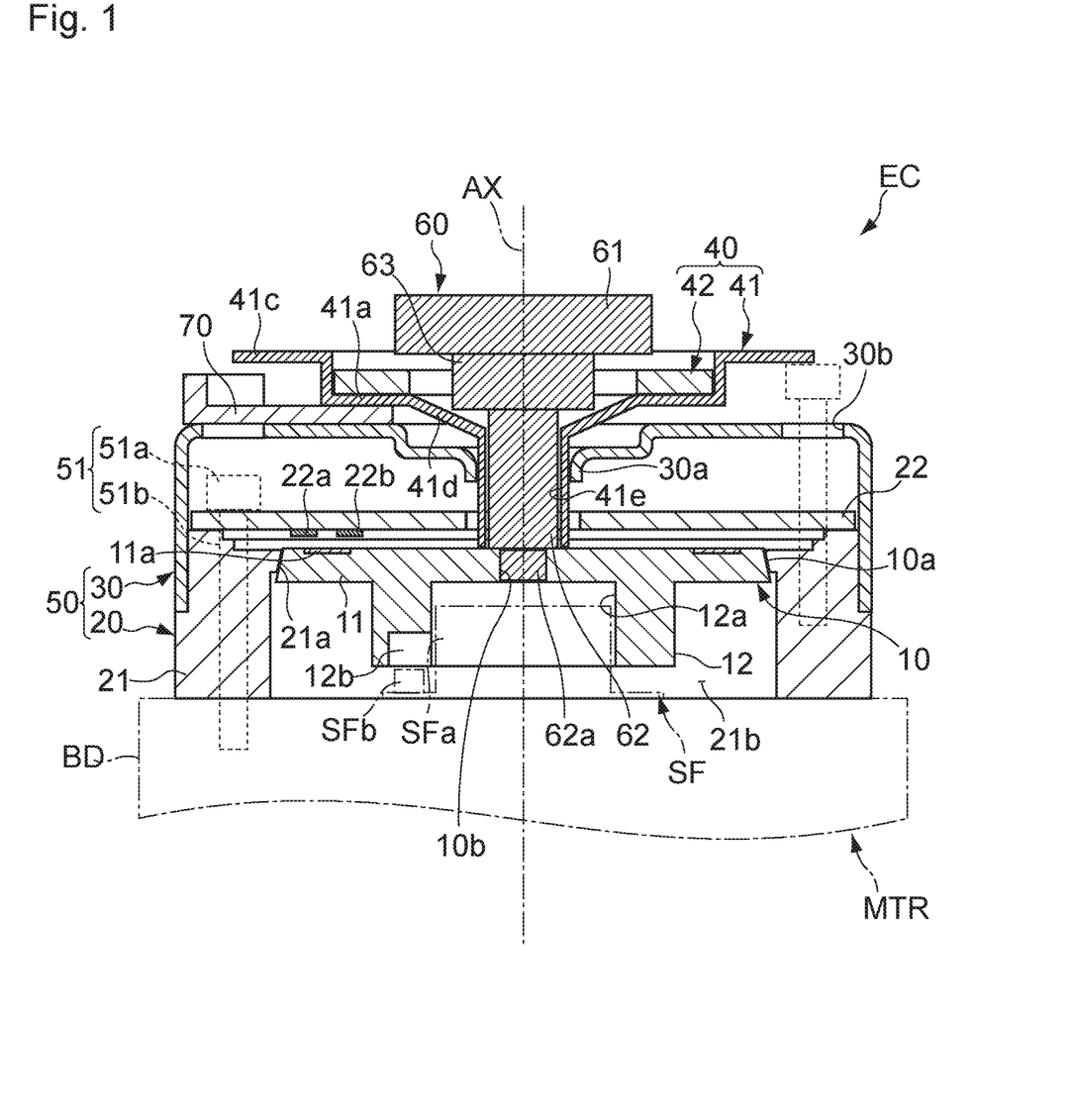
FIG. 1 is a sectional view illustrating an example of an encoder according to an embodiment of the present invention.

FIG. 1 is a sectional view illustrating an overall configuration of an encoder EC according to one embodiment, illustrating the state before mounted to a motor apparatus MTR. As illustrated in FIG. 1, the encoder EC includes a scale 10, a main body 50, and a holding member 40. In FIG. 1, a part (motor main body BD and shaft member SF) of the motor apparatus (drive apparatus) MTR is indicated by alternate long and short dashed lines.

The scale 10 includes a pattern forming portion 11 and a mounting portion 12. The scale 10 is arranged so as to rotate about a rotation axis AX. The pattern forming portion 11 has a circular shape having a predetermined diameter centered at the rotation axis AX. The pattern forming portion 11 is formed from a material having rigidity high enough not to be easily deformed by rotation, impact, or vibration, such as glass, metal, resin, and ceramics. The material, thickness, dimensions, and other parameters of the pattern forming portion 11 can be determined as appropriate depending on its application, such as the number of rotations of a shaft portion to which the encoder EC is mounted, and installation environments such as temperature and humidity where the encoder EC is installed. The pattern forming portion 11 has a disc shape, and a light reflection pattern 11a is formed on the surface of the pattern forming portion 11. The light reflection pattern 11a is formed along the direction about the rotation axis AX.

The mounting portion 12 has a cylindrical shape protruding from the pattern forming portion 11. The mounting portion 12 is mounted to a rotary member of an object to be measured, such as the shaft member SF of the motor apparatus MTR. The mounting portion 12 has a recess 12a and a key groove 12b (groove portion) formed therein. The recess 12a allows an insertion portion SFa of the shaft member SF described later to be inserted therein. The key groove 12b allows a pin SFb (protrusion portion) of the shaft member SF described later to be inserted therein.

A tapered surface 10a is formed on the outer circumference of the scale 10. The tapered surface 10a is formed so as to expand inward from the outer side of a casing 21 described later. The scale 10 is fitted into the casing 21, with the tapered surface 10a abutting the casing 21. A through hole 10b is formed at a central part of the scale 10 when viewed in the direction of the rotation axis AX. The through hole 10b communicates to the recess 12a. Threads are formed in the through hole 10b at predetermined pitches.

The main body 50 includes a base portion 20 and a cover portion 30. The base portion 20 includes the casing 21 and a detection substrate (detector) 22. For example, the casing 21 has a cylindrical shape. A fitting portion 21a is formed on an inner circumferential surface of the casing 21. The fitting portion 21a is used to fit the above-mentioned scale 10, and has a tapered shape corresponding to the above-mentioned tapered surface 10a. On the basis of this configuration, the positions of the scale 10 and the casing 21 are maintained with each other when the tapered surface 10a and the fitting portion 21a are fitted together. The fitting portion 21a has a circular shape centered at the rotation axis AX when viewed in the direction of the rotation axis AX. The casing 21 has a housing space 21b. The housing space 21b houses therein the scale 10 in the space defined together with the motor main body BD with the scale 10 fixed to the shaft member SF. A part of fixation members (first fixation members) 51 is inserted through the casing 21. The fixation members 51 fix the casing 21 (base portion 20) to the motor main body BD.

The fixation members 51 are provided in plurality to the casing 21, and each have a head portion 51a and a screw portion 51b.

The detection substrate 22 is a plate-shaped member having a circular shape in plan view, for example. The detection substrate 22 is formed integrally with the casing 21, and is mounted on an end surface of the casing 21, for example. The detection substrate 22 has a light emitter 22a and a light receiver 22b. The light emitter 22a emits light to the light reflection pattern 11a formed on the scale 10. The light receiver 22b can detect light reflected by the light reflection pattern 11a. The detection substrate 22 is capable of detecting the light reflection pattern 11a on the basis of the detection result by the light receiver 22b.

The cover portion 30 covers the scale 10 and the base portion 20, and is mounted to the base portion 20, for example. The cover portion 30 is formed from a magnetic substance, such as iron, cobalt, and nickel. The cover portion 30 only needs to be provided with a magnetic substance in at least a part of the range where magnetic force of a magnet 42 described later acts. The cover portion 30 has an insertion portion 30a and opening portions 30b formed therein. The insertion portion 30a allows a part of the holding member 40 to be inserted therein from the outside of the cover portion 30. The insertion portion 30a is formed to completely pass through the cover portion 30. The insertion portion 30a is arranged on the rotation axis AX when the encoder EC is mounted to the motor apparatus MTR. The insertion portion 30a is formed so as to protrude to the inner side of the cover portion 30. The opening portions 30b allow the above-mentioned fixation members 51 to be inserted therethrough. The opening portions 30b are provided in plurality about the axial line of the rotation axis AX correspondingly to the positions at which the fixation members 51 are mounted.

The holding member 40 is used to mount the encoder EC to the motor apparatus MTR. The holding member 40 has an abutment portion 41 and the magnet (pushing portion) 42.

The abutment portion 41 is mounted to the cover portion 30 from outside the cover portion 30. The abutment portion 41 is removably provided to the cover portion 30. The abutment portion 41 is arranged on the direction of the rotation axis AX. The abutment portion 41 has a base portion 41a, a cylindrical portion 41b, and an anti-removal portion 41c. The base portion 41a is arranged outside the cover portion 30, and has an annular shape when viewed in the direction of the rotation axis AX, for example. The base portion 41a has an inclined portion 41d at a central part when viewed in the direction of the rotation axis AX. The inclined portion 41d is formed so as to protrude to the cover portion 30 side.

The cylindrical portion 41b is connected to the inclined portion 41d of the base portion 41a, and has a cylindrical shape, for example. The shape of the cylindrical portion 41b is not limited to a cylindrical shape, and may be another shape. The cylindrical portion 41b is inserted through the insertion portion 30a in the cover portion 30. The cylindrical portion 41b is arranged along the direction of the rotation axis AX. An inner wall portion (guiding portion) 41e of the cylindrical portion 41b is arranged along the direction of the rotation axis AX. The cylindrical portion 41b has a distal end (lower end portion in FIG. 1) that abuts the scale 10. The cylindrical portion 41b is arranged so as to surround the through hole 10b in the state of being in abutment with the scale 10.

The anti-removal portion 41c has a flange shape that extends from the outer circumference of the base portion 41a to the radially outer side. The anti-removal portion 41c is formed so as to cover the fixation members 51 when viewed in the direction of the rotation axis AX. The anti-removal portion 41c thus prevents the fixation members 51 from falling off by abutting the fixation members 51 when the fixation members 51 are otherwise likely to fall off in the direction of the rotation axis AX.

For example, the magnet 42 has an annular shape, and is arranged on a part of the abutment portion 41 on the outer side of the cover portion 30. In the present embodiment, for example, the magnet 42 is fixed to a surface of the base portion 41a on the side opposite to a surface opposed to the cover portion 30. The shape of the magnet 42 is not limited to an annular shape, and may be another shape. A plurality of magnets may be arranged side by side about the rotation axis AX. The magnet 42 may be arranged on a surface of the base portion 41a that is opposed to the cover portion 30.

The magnet 42 causes magnetic force (attractive force) to act between the magnet 42 and the cover portion 30. The magnet 42 is provided in the state in which the magnet 42 is attracted toward the cover portion 30 by the magnetic force. The magnet 42 thus pushes the abutment portion 41 toward the scale 10 along the direction of the rotation axis AX.

The abutment portion 41 is mounted with a position adjustment handle (adjustment tool) 60. The position adjustment handle 60 has a head 61, a shaft portion 62, and an increased diameter portion 63. For example, the head 61 has a disc shape, and has a diameter larger than those of the inclined portion 41d and the cylindrical portion 41b described above. The shaft portion 62 has a diameter smaller than that of the cylindrical portion 41b, and is inserted inside the cylindrical portion 41b. For example, the shaft portion 62 has a columnar shape. A distal end (lower end portion in FIG. 1) 62a of the shaft portion 62 is formed so as to be insertable in the through hole 10b in the scale 10. Threads to be screwed with the through hole 10b are formed in the distal end 62a in the direction about the rotation axis AX. In the present embodiment, the distal end 62a is provided in the state in which the distal end 62a is screwed with the through hole 10b. This configuration prevents the position adjustment handle 60 from falling off, for example, when the head 61 is arranged under the shaft portion 62 in the direction of gravity.

For example, rotating the head 61 about the rotation axis AX enables the distal end 62a and the through hole 10b to be tightly or loosely screwed. For another example, further rotating the head 61 in the tightening direction in the state in which the distal end 62a and the through hole 10b are sufficiently tightened enables the rotation of the head 61 to be transmitted to the scale 10. This configuration can adjust the rotation position of the scale 10. The increased diameter portion 63 is provided between the head 61 and the shaft portion 62. The increased diameter portion 63 has a diameter larger than the inner diameter of the cylindrical portion 41b so that the diameter portion 63 abuts the inclined portion 41d of the base portion 41a. When the increased diameter portion 63 abuts the inclined portion 41d, the shaft portion 62 is restricted from being inserted in the cylindrical portion 41b to a predetermined depth or more.

A stopper (scale movement restricting portion) 70 is arranged between the base portion 41a and the cover portion 30. The stopper 70 has a plate shape, and is removably provided between the base portion 41a and the cover portion 30. When the stopper 70 is arranged, the stopper 70 restricts the movement of the abutment portion 41 toward the scale 10. Accordingly, the movement of the scale 10 toward the motor apparatus MTR is restricted. In this manner, the stopper 70 restricts the movement of the scale 10 toward the motor apparatus MTR via the holding member 40.

The encoder EC in the present embodiment is configured such that the tapered surface 10a of the scale 10 abuts the fitting portion 21a to restrict the movement of the scale 10 in the direction away from the motor main body BD. The position adjustment handle 60 screwed with the scale 10, the abutment portion 41 that restricts the movement of the position adjustment handle 60, and the stopper 70 that restricts the movement of the abutment portion 41 together restrict the movement of the scale 10 in the direction approaching the motor main body BD. In this manner, the scale 10 is restricted from moving in the direction of the rotation axis AX. With the stopper 70 removed, the restriction of the movement of the stopper 70 is released to enable the scale 10 to move toward the motor apparatus MTR.

Drive Apparatus

Figure 2:
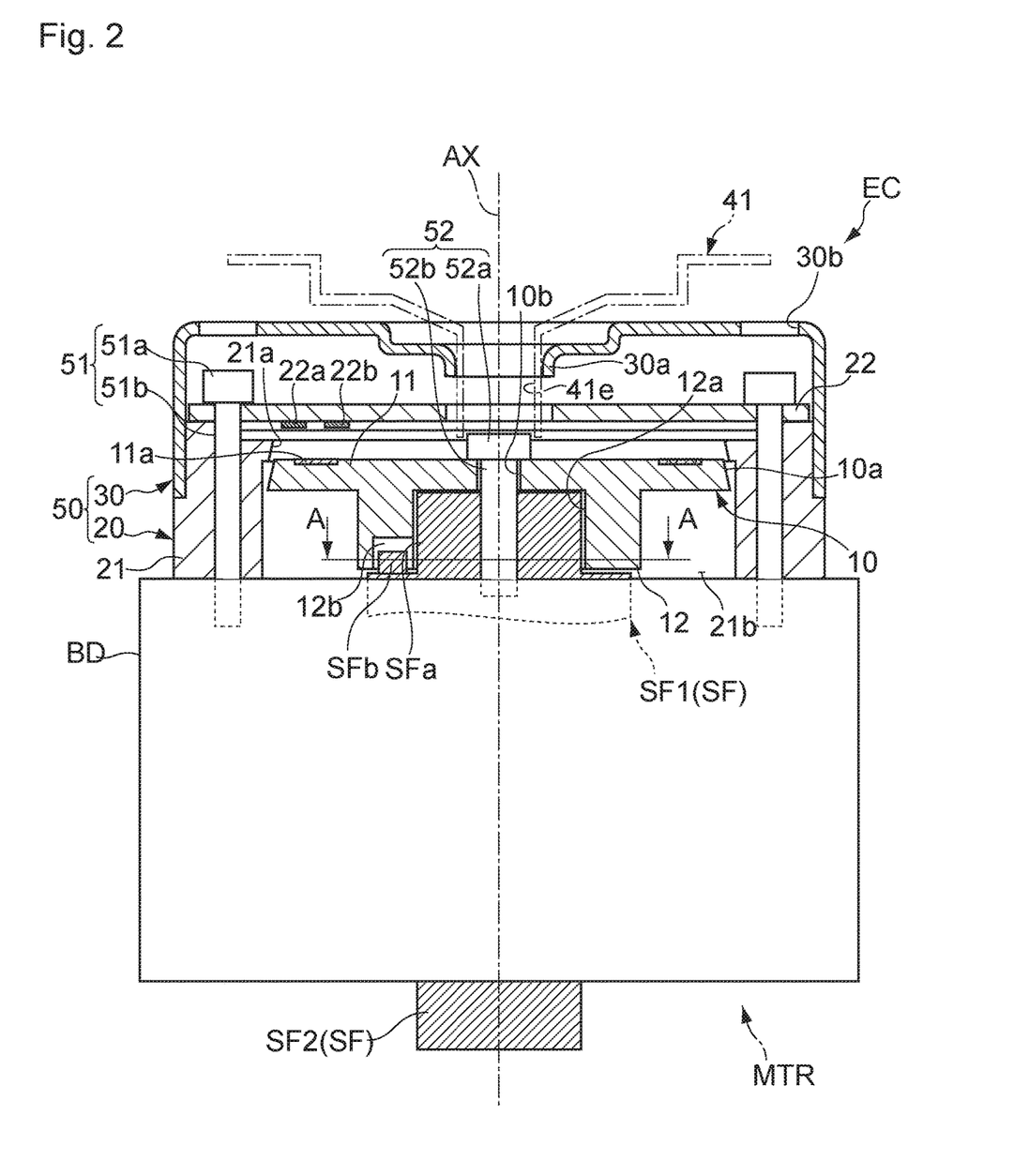
FIG. 2 is a sectional view illustrating an example of a motor apparatus according to the embodiment.

FIG. 2 is a sectional view illustrating an overall configuration of the motor apparatus (drive apparatus) MTR with the encoder EC mounted.

As illustrated in FIG. 2, the motor apparatus MTR includes the shaft member (rotary member) SF, the motor main body (driver) BD, which is a non-rotating portion that rotationally drives the shaft member SF, and the encoder EC to detect rotation information of the shaft member SF.

The shaft member SF has a load-side end portion SF1 and an anti-load-side end portion SF2. The load-side end portion SF1 is connected to another power transmission mechanism such as a reducer. The scale 10 of the encoder EC is fixed to the anti-load-side end portion SF2. The casing 21 of the encoder EC is mounted to the motor main body BD.

The casing 21 is fixed to the motor main body BD via the fixation members 51. Mounting holes for inserting the fixation members 51 therein are formed in the motor main body BD.

The scale 10 is fixed to the shaft member SF via a fixation member (second fixation member) 52. For example, a Nylok screw is used for the fixation member 52. The fixation member 52 includes a head 52a and a screw portion 52b. The head 52a has a diameter larger than that of the through hole 10b, and can fasten the scale 10 to the shaft member SF. The screw portion 52b has a diameter that can be inserted in the through hole 10b. The shaft member SF has formed therein a screw hole to be screwed with the screw portion 52b.

The head 52a has a diameter smaller than the inner diameter of the cylindrical portion 41b of the holding member 40 described above, and can be inserted through the cylindrical portion 41b. In this case, the fixation member 52 is guided to the scale 10 by the inner wall portion 41e of the cylindrical portion 41b along a direction of a rotation axis AX, and is inserted through the through hole 10b. In this manner, the inner wall portion 41e of the cylindrical portion 41b serves as a guiding portion that guides the fixation member 52 to the scale 10.

Figure 3:
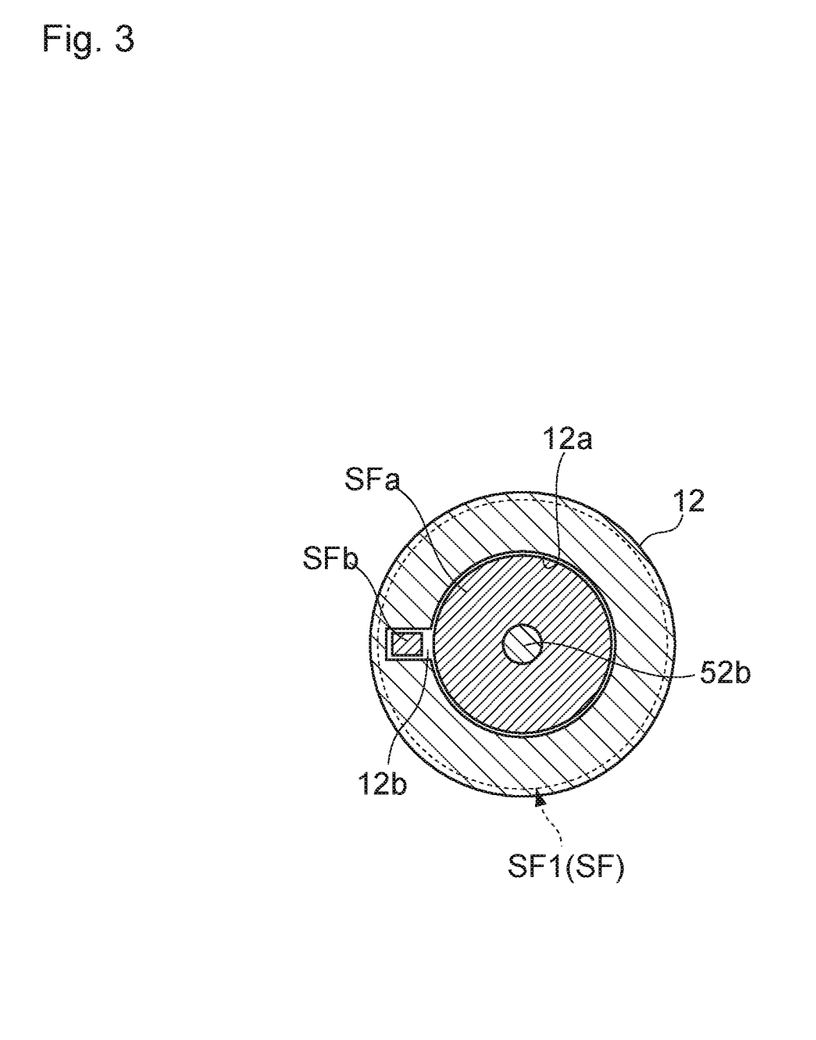
FIG. 3 is a cross-sectional view illustrating an example of a part of the motor apparatus according to the embodiment.

The scale 10 is mounted such that the insertion portion SFa of the shaft member SF is inserted in the recess 12a and the pin SFb is inserted in the key groove 12b. FIG. 3 is a cross-sectional view taken along the line A-A in FIG. 2. As illustrated in FIG. 3, the key groove 12b allows the pin SFb provided to the shaft member SF to be inserted therein. The pin SFb and the key groove 12b are used to position the shaft member SF and the scale 10 in the direction about the rotation axis AX.

When the scale 10 is fixed to the shaft member SF in the state in which the pin SFb is inserted in the key groove 12b, the motor apparatus MTR and the scale 10 have a predetermined positional relation in the direction about the rotation axis AX. The positions of the pin SFb and the key groove 12b in the direction about the rotation axis AX are set in advance such that the motor apparatus MTR and the scale 10 have a predetermined positional relation.

The light reflection pattern 11a of the scale 10 and the light emitter 22a and the light receiver 22b of the detection substrate 22 are arranged so as to be opposed to each other with a predetermined distance therebetween. With the scale 10 fixed to the shaft member SF, the surface of the scale 10 on which the light reflection pattern 11a is formed is perpendicular to the shaft member SF. In this state, the direction of the rotation axis AX is the same as the extending direction of the shaft member SF. With the scale 10 fixed to the shaft member SF, the scale 10 is housed in the casing 21 so as not to be in contact with the casing 21.

The operation of the encoder EC mounted to the motor apparatus MTR is now described. When the shaft member SF rotates, the scale 10 and the light reflection pattern 11a that are mounted integrally with the shaft member SF rotate integrally with the shaft member SF. The detection substrate 22 is not connected to the shaft member SF, and thus remains stationary without being rotated.

When the scale 10 rotates, the light reflection pattern 11a formed on the scale 10 moves in the rotation direction. The above-mentioned light receiver 22b reads light reflected via the light reflection pattern 11a among light beams emitted from a light source, thereby being capable of detecting rotation information (for example, rotation angle and the number of rotations) of the shaft member SF on the basis of the movement angle of the light reflection pattern 11a. In this manner, the encoder EC is capable of detecting the rotation information of the shaft member SF.

Method of Mounting Encoder

Next, a procedure of mounting the encoder EC to the motor apparatus MTR is described. The present embodiment takes an example where the motor apparatus MTR is disposed with the shaft member SF located under the motor main body BD in the direction of gravity.

Figure 4A:
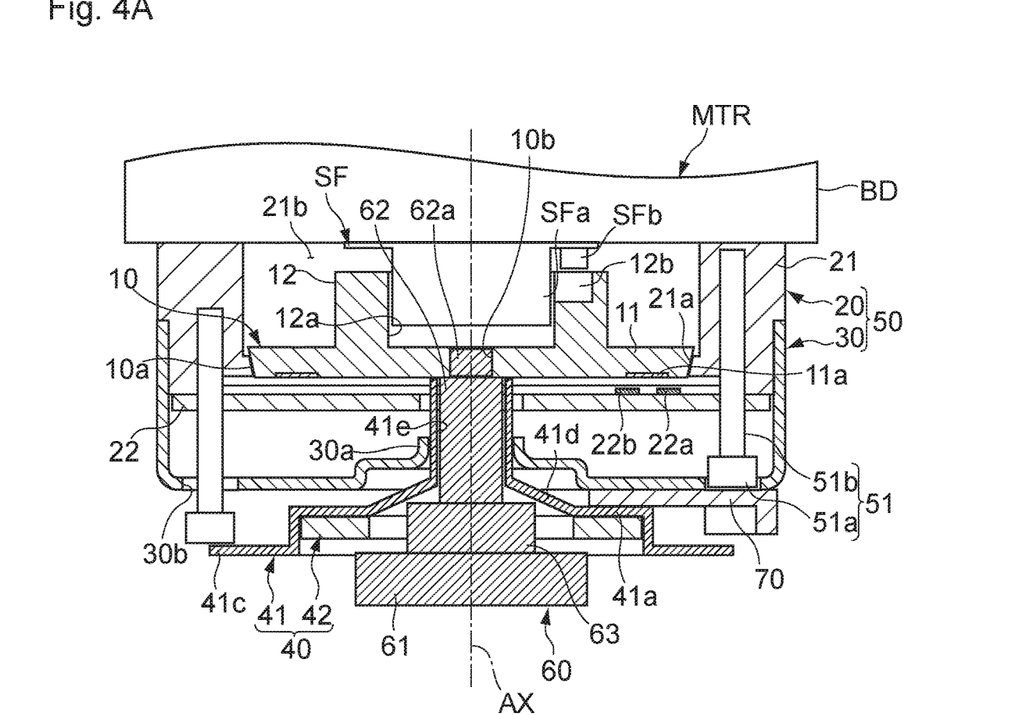
FIGS. 4A and 4B are each a view illustrating a step in an example of a method of mounting the encoder according to the embodiment.

First, as illustrated in FIG. 4A, the encoder EC is arranged on the motor main body BD such that the shaft member SF is inserted in the recess 12a in the scale 10. The positions of the motor main body BD and the base portion 20 (casing 21 and detection substrate 22) are determined in the state in which the scale 10 and the shaft member SF are fitted together. Specifically, the base portion 20 is positioned on the basis of the fitting state of the motor shaft of the motor apparatus MTR.

Figure 4B:
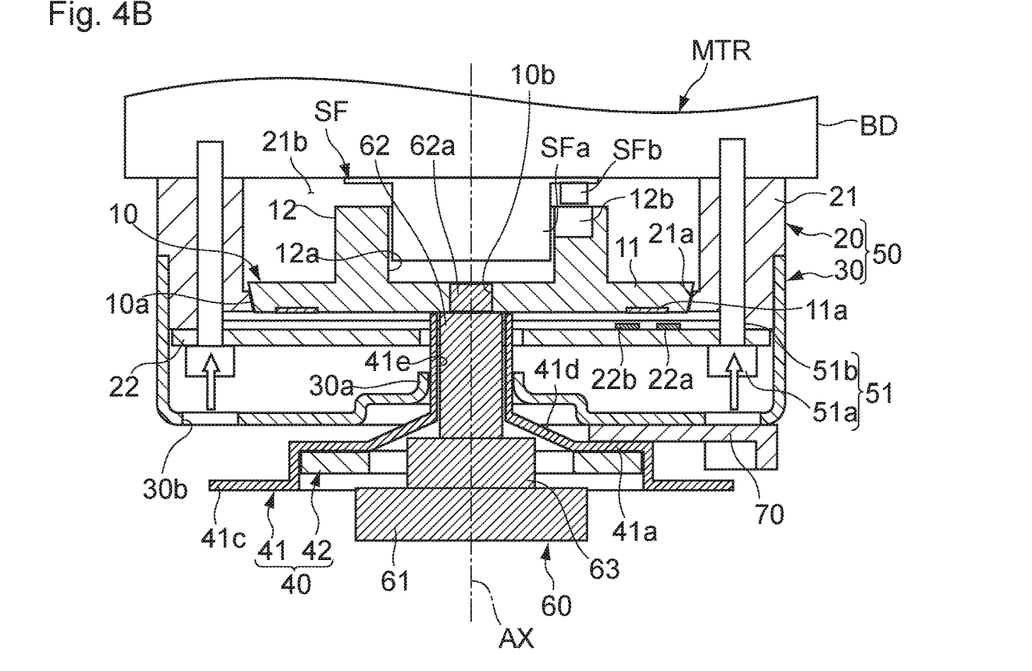

In this state where the head portions 51a of the fixation members 51 are arranged downward in the direction of gravity, there is a fear that the fixation members 51 may fall off from the casing 21 along the direction of the rotation axis AX due to the gravitational force. In the present embodiment, however, the abutment portion 41 of the holding member 40 is mounted to the encoder EC, and hence the anti-removal portion 41c is arranged on the direction of the rotation axis AX with respect to the fixation members 51, thereby restricting the falling off of the fixation members 51. After the base portion 20 is positioned in this manner, as illustrated in FIG. 4B, the fixation members 51 are used to fix the casing 21 to the motor main body BD (first fixation step).

Figure 5A:
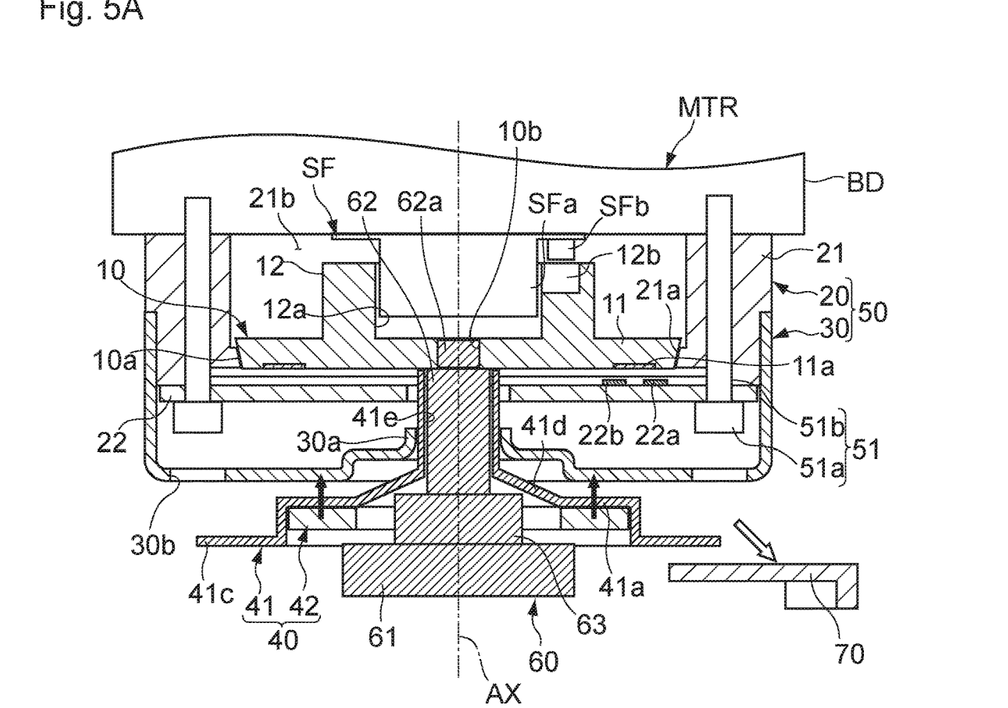
FIGS. 5A and 5B are each a view illustrating a step in an example of the method of mounting the encoder according to the embodiment.

After the casing 21 is fixed, the stopper 70 is removed as illustrated in FIG. 5A. A clearance is thus formed between the base portion 41a of the abutment portion 41 and the cover portion 30, and the scale 10 is allowed to move toward the motor main body BD side by the clearance. With the stopper 70 removed, the magnet 42 pushes the abutment portion 41 to the scale 10 side (upward in direction of gravity) due to magnetic force acting between the magnet 42 and the cover portion 30.

Figure 5B:
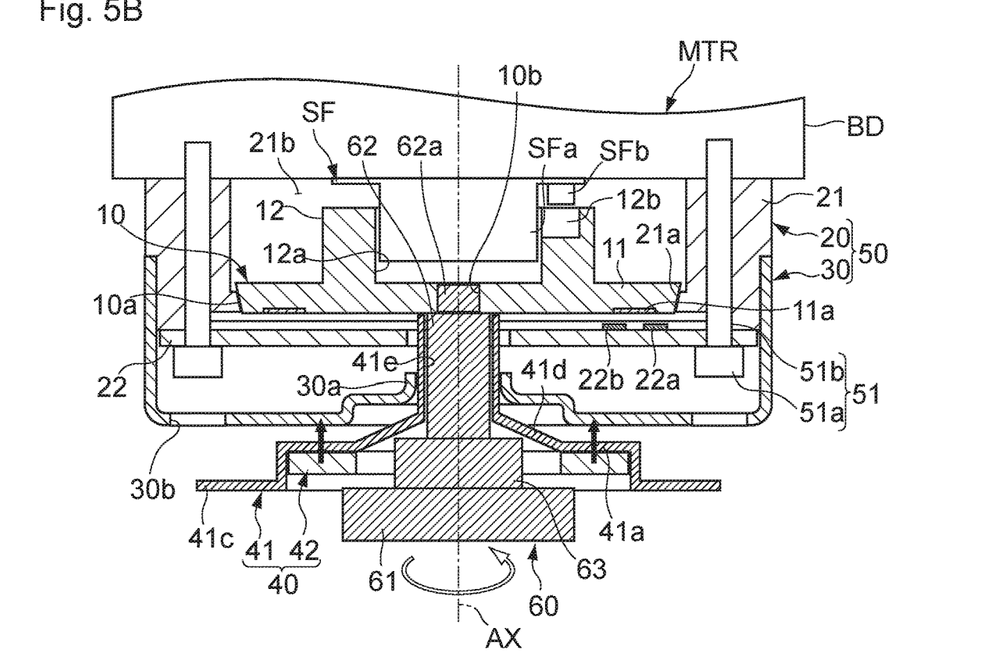
Figure 6A:
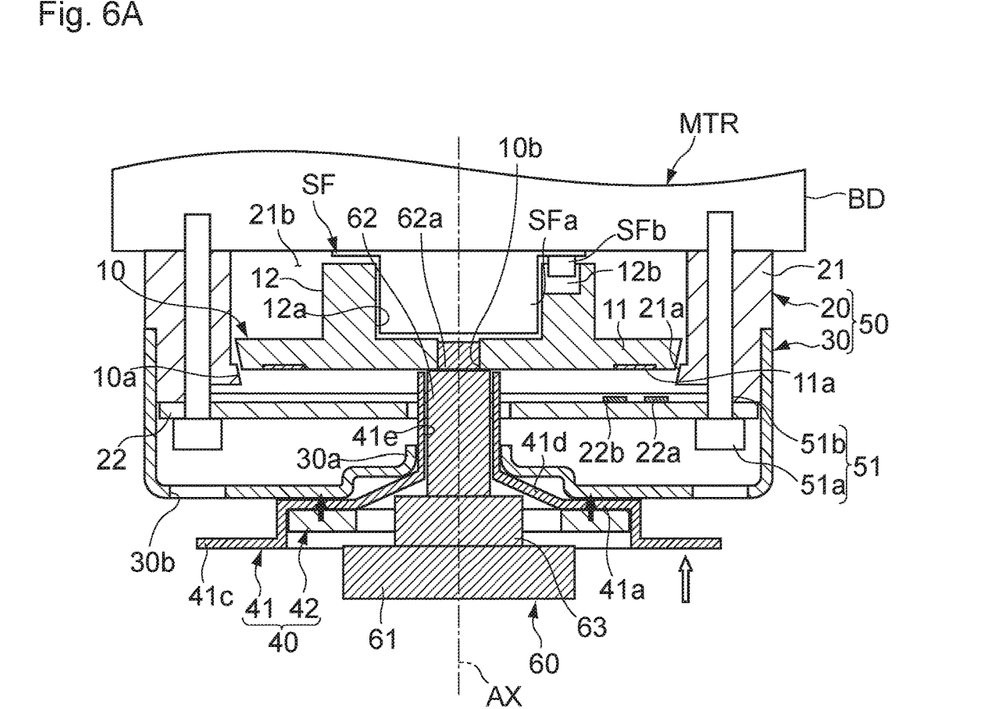
FIGS. 6A and 6B are each a view illustrating a step in an example of the method of mounting the encoder according to the embodiment.

Subsequently, the position adjustment handle 60 mounted to the holding member 40 is used to rotate the scale 10 about the rotation axis AX, thereby adjusting the rotation position of the scale 10 (adjustment step). The adjustment step involves rotating the scale 10 such that the pin SFb formed on the shaft member SF and the key groove 12b formed in the scale 10 overlap with each other in the direction of the rotation axis AX as illustrated in FIG. 5B. The pushing force from the abutment portion 41 acts on the scale 10, and hence when the pin SFb and the key groove 12b overlap with each other in the direction of the rotation axis AX, as illustrated in FIG. 6A, the scale 10 moves toward the motor main body BD, and the pin SFb is inserted in the key groove 12b. Accordingly, the motor apparatus MTR and the scale 10 are adjusted to have a predetermined positional relation. When the scale 10 moves toward the motor main body BD, the fitting of the scale 10 and the fitting portion 21a is released.

Figure 6B:
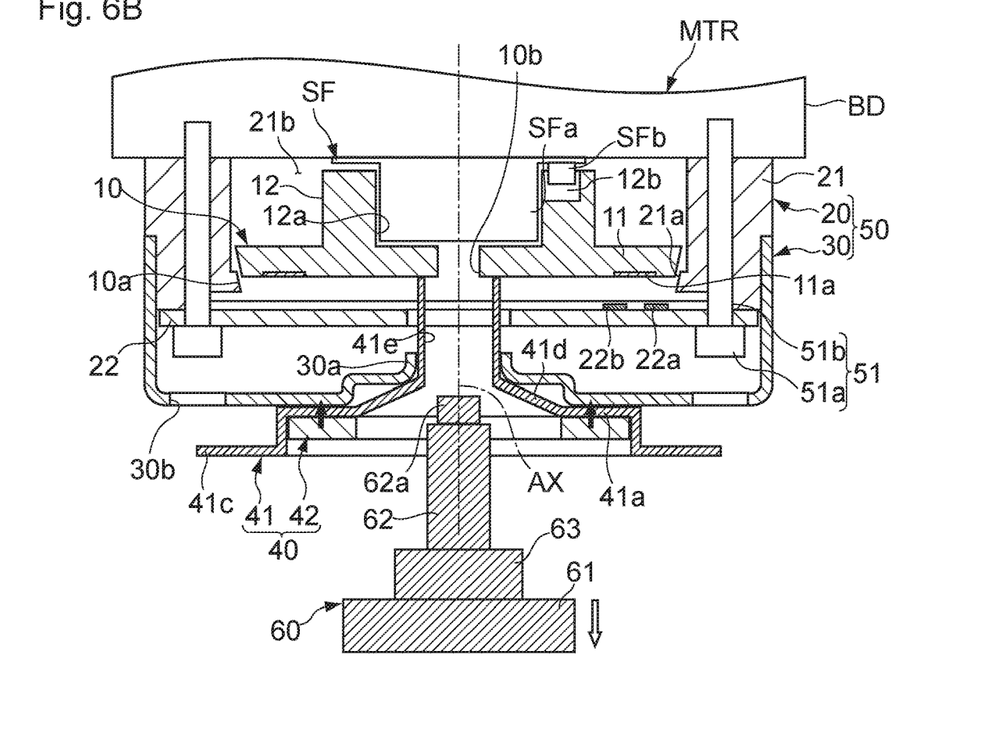

After that, as illustrated in FIG. 6B, the position adjustment handle 60 is removed from the scale 10 and removed from the holding member 40. In this case, the pushing force from the abutment portion 41 continuously acts on the scale 10, and hence even after the position adjustment handle 60 is pulled out, the scale 10 is supported by the abutment portion 41. This configuration prevents the scale 10 from falling off from the shaft member SF.

Figure 7A:
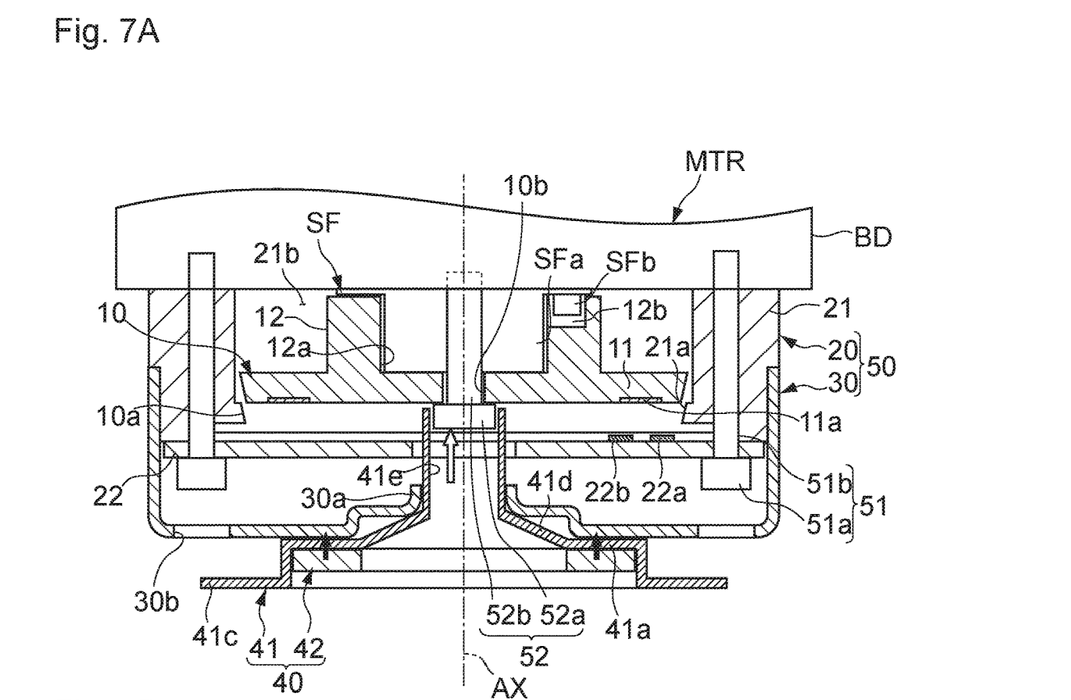
FIGS. 7A and 7B are each a view illustrating a step in an example of the method of mounting the encoder according to the embodiment.
Figure 7B:
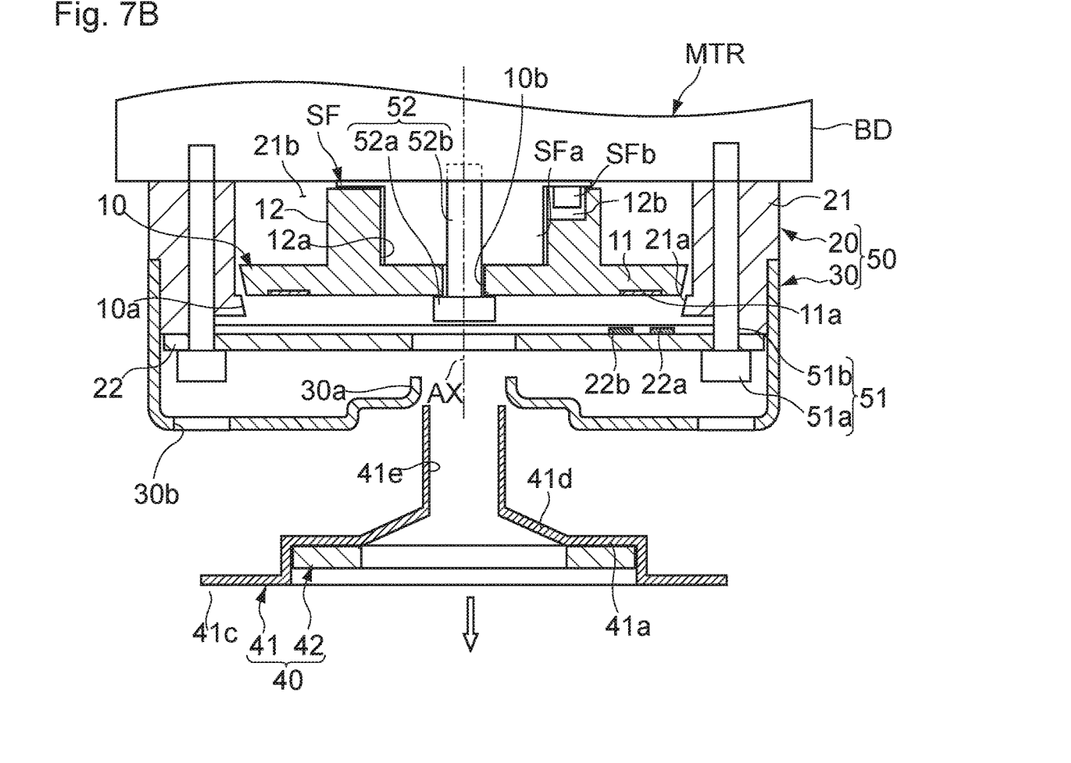

Subsequently, the fixation member 52 is inserted through the cylindrical portion 41b as illustrated in FIG. 7A. The fixation member 52 is guided in the direction of the rotation axis AX by the inner wall portion 41e of the cylindrical portion 41b, and the screw portion 52b is inserted through the through hole 10b. After that, the fixation member 52 is fastened to fix the scale 10 to the shaft member SF. After the scale 10 is fixed, the holding member 40 is pulled out of the cover portion 30 as illustrated in FIG. 7B. In this manner, the encoder EC is mounted to the motor apparatus MTR.

As described above, the present embodiment uses the holding member 40, which has the abutment portion 41 to be brought into abutment with the scale 10 while passing through the cover portion 30 and the magnet 42 that pushes the abutment portion 41 to the scale 10 side, to mount the encoder EC, and hence even when the shaft member SF is arranged lower than the motor main body BD in the direction of gravity, the scale 10 can be prevented from falling off from the shaft member SF because the pushing force from the magnet 42 acts on the scale 10. Consequently, the encoder EC can be mounted irrespective of the posture of the motor apparatus MTR.

Robot Apparatus

Figure 8:
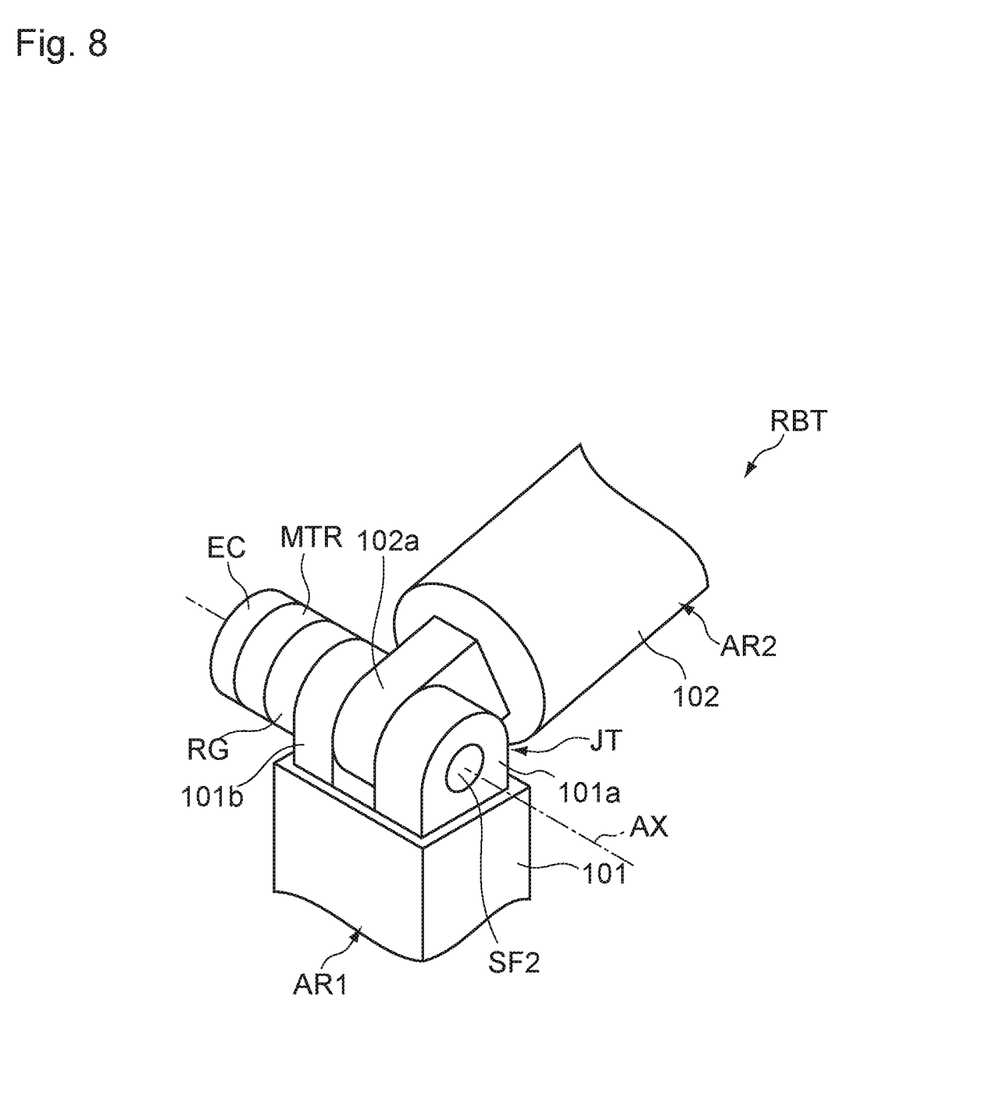
FIG. 8 is a perspective view illustrating an example of a robot apparatus according to an embodiment.

A robot apparatus according to one embodiment is now described. FIG. 8 is a perspective view illustrating an exemplary robot apparatus RBT according to the embodiment. FIG. 8 schematically illustrates the configuration of a part (joint part) of the robot apparatus RBT. In the following description, the same or similar components as those in the above-mentioned embodiments are denoted by the same reference symbols and descriptions thereof are omitted or simplified. As illustrated in FIG. 8, the robot apparatus RBT includes a first arm AR1, a second arm AR2, and a joint portion JT, and the first arm AR1 and the second arm AR2 are connected via the joint portion JT.

The first arm AR1 includes an arm portion 101 and bearings 101a and 101b. The second arm AR2 is provided with an arm portion 102 and a connection portion 102a. In the joint portion JT, the connection portion 102a is disposed between the bearings 101a and 101b. The connection portion 102a is provided integrally with a shaft member SF2. In the joint portion JT, the shaft member SF2 is inserted through both the bearings 101a and 101b. One end portion of the shaft member SF2 that is inserted through the bearing 101b passes through the bearing 101b to be connected to a reducer RG.

The reducer RG is connected to a motor apparatus MTR. The reducer RG reduces the rotation of the motor apparatus MTR to, for example, about 1/100 and transmits the rotation to the shaft member SF2. As the motor apparatus MTR, the motor apparatus MTR illustrated in FIG. 2 is used. Although not illustrated in FIG. 8, a load-side end portion SF1 of a shaft member SF in the motor apparatus MTR is connected to the reducer RG. The scale 10 of the encoder EC is mounted to the anti-load-side end portion SF2 of the shaft member SF of the motor apparatus MTR.

In the robot apparatus RBT configured as described above, when the motor apparatus MTR is driven to rotate the shaft member SF, the rotation of the shaft member SF is transmitted to the shaft member SF2 via the reducer RG. When the shaft member SF2 rotates, the connection portion 102a integrally rotates, and accordingly the second arm AR2 rotates relative to the first arm AR1. At this time, the encoder EC detects the rotation position of the shaft member SF. The use of the output from the encoder EC thus enables the rotation position of the second arm AR2 to be detected.

As described above, the robot apparatus RBT, which has mounted thereon the compact motor apparatus MTR having excellent controllability for the rotation amount, enables the entire robot apparatus RBT to be downsized. The robot apparatus RBT, which includes the compact encoder EC, enables the amount of protrusion from the joint portion JT to be reduced to suppress interference of the protrusion with another apparatus. The robot apparatus RBT is not limited to the above-mentioned configuration, and, for example, the motor apparatus MTR can be mounted to various kinds of robot apparatuses having a joint.

Stage Apparatus

Figure 9:
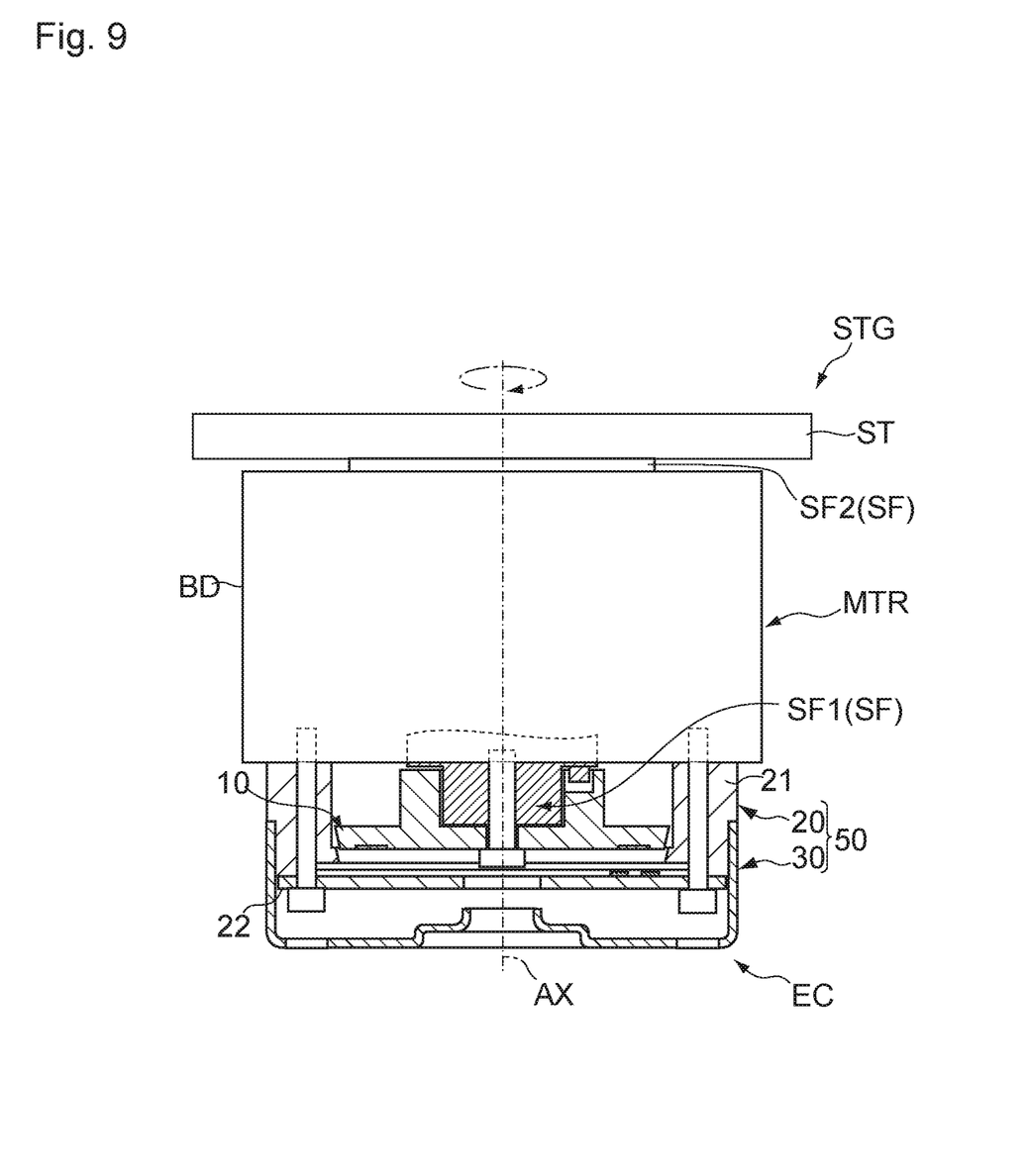
FIG. 9 is a view illustrating an example of a stage apparatus according to an embodiment.

A stage apparatus according to one embodiment is now described. FIG. 9 is a perspective view illustrating an exemplary embodiment of a stage apparatus STG. FIG. 9 illustrates a configuration in which a rotary table (moving object) ST is mounted to the load-side end portion SF1 of the shaft member SF in the motor apparatus MTR illustrated in FIG. 2. In the following description, the same or similar components as those in the above-mentioned embodiments are denoted by the same reference symbols and descriptions thereof are omitted or simplified.

In the stage apparatus STG configured as described above, when the motor apparatus MTR is driven to rotate the shaft member SF, the rotation of the shaft member SF is transmitted to the rotary table ST. At this time, the encoder EC detects the rotation position of the shaft member SF. The use of the output from the encoder EC thus enables the rotation position of the rotary table ST to be detected. A reducer or other components may be arranged between the load-side end portion SF1 of the motor apparatus MTR and the rotary table ST.

The stage apparatus STG, which has mounted thereon the compact motor apparatus MTR having excellent controllability for the rotation amount, has excellent position adjustment accuracy for the rotary table ST to downsize the entire stage apparatus STG. The stage apparatus STG may be applied to a rotary table included in a machine tool such as a lathe.

While the embodiments have been described, the present invention is not intended to be limited to the above description, and various modifications can be made in the range not departing from the gist of the present invention. For example, while the embodiments have been described by taking as an example the case where the base portion 20 is fixed to motor main body BD with the holding member 40 mounted to the cover portion 30, the embodiments are not limited to this configuration. For example, the holding member 40 may be mounted to the cover portion 30 after the base portion 20 is fixed to the motor main body BD and prior to the adjustment step. The position adjustment handle 60 may be mounted to the holding member 40 after the holding member 40 is mounted to the cover portion 30.

While the embodiments have been described by taking as an example the configuration in which the cylindrical portion 41b is provided to the abutment portion 41, the embodiments are not limited to the cylindrical configuration. The embodiments may employ any shape that can guide the fixation member 52 and the shaft portion 62 of the position adjustment handle 60, such as a configuration in which a plurality of rod-shaped members are arranged around the rotation axis AX.

While the embodiments have been described by taking the magnet 42 as an example of the pushing portion, the embodiments are not limited to this configuration and may employ another configuration. For example, an elastic body such as a spring member or a rubber member may be arranged between the abutment portion 41 and the cover portion 30 so as to stretch therebetween, and the elastic member may serve as a pushing portion. In this case, the abutment portion 41 is attracted to the cover portion 30 by elastic force of the elastic member, and pushes the scale 10. The elastic member is not limited to be arranged between the abutment portion 41 and the cover portion 30, and may be provided on the side of the abutment portion 41 opposite to the cover portion 30.

While the embodiments have been described by taking as an example the configuration in which the pushing portion pushes the abutment portion 41 in the direction of the rotation axis AX, the embodiments are not limited to this configuration. The pushing portion may push the abutment portion 41 in a direction inclined with respect to the axial direction. For example, in the case where the shaft member SF of the motor apparatus MTR is arranged to be inclined with respect to the direction of gravity, the pushing portion may push the abutment portion 41 along the upward direction of gravity rather than in the direction of the rotation axis AX.

While the embodiments have been described by taking as an example the configuration in which the anti-removal portion 41c is provided on the outer circumference of the base portion 41a of the abutment portion 41, the embodiments are not limited to this configuration. The anti-removal portion 41c may be omitted. The cylindrical portion 41b of the abutment portion 41 may be configured not to guide the fixation member 52 or the shaft portion 62 of the position adjustment handle 60. Examples of such a configuration include a rod-shaped configuration.

While the embodiments have been described by taking as an example the configuration in which a magnetic substance is provided to the cover portion 30, the embodiments are not limited to this configuration. For example, a magnetic substance may be provided to the base portion 20 in the main body 50. In this case, the magnet 42 can push the abutment portion 41 to the scale 10 side by magnetic force that acts between the magnet 42 and the magnetic substance provided to the base portion 20.

DESCRIPTION OF REFERENCE SIGNS

MTR motor apparatus, AX rotation axis, SF shaft member, SFb pin, BD motor main body, RBT robot apparatus, EC encoder, STG stage apparatus, 10 scale, 11a light reflection pattern, 12b key groove, 20 base portion, 22 detection substrate, 22a light emitter, 22b light receiver, 30 cover portion, 40 holding member, 41 abutment portion, 42 magnet, 51, 52 fixation member, 60 position adjustment handle, 70 stopper

What is claimed is:

1. An encoder, comprising:
a scale that has a pattern and is mountable to a rotary member of an object to be measured;
a main body including a detector that detects the pattern, the main body being mountable to a non-rotating portion of the object to be measured; and
a holding member including:
an abutment portion that is removably provided to the main body from outside the main body and passes through the main body to abut the scale such that the scale is capable of rotating with respect to the rotary member; and
a pushing portion that is capable of pushing the abutment portion toward the scale.

2. The encoder according to claim 1, wherein the pushing portion pushes the abutment portion in a direction of a rotation axis of the rotary member.

3. The encoder according to claim 1, wherein
the main body is mounted with use of a first fixation member, and
the holding member includes an anti-removal portion that prevents the first fixation member from falling off.

4. The encoder according to claim 1, wherein
the scale is mounted with use of a second fixation member, and
the holding member includes a guiding portion that guides the second fixation member to the scale from outside the holding member.

5. The encoder according to claim 4, wherein
the guiding portion has a cylindrical shape, and
the guiding portion includes an inner wall portion of the abutment portion.

6. The encoder according to claim 1, wherein
the scale includes a groove portion that allows a protrusion portion provided to the rotary member to be inserted in the scale, and
the groove portion and the protrusion portion are arranged such that the scale and the object to be measured have a predetermined positional relation in a direction about the rotation axis.

7. A drive apparatus, comprising:
a rotary member;
a driver that rotates the rotary member; and
an encoder that is fixed to the rotary member and detects positional information of the rotary member, wherein
the encoder is the encoder according to claim 1.

8. A robot apparatus, comprising:
a rotating body; and
a drive apparatus that rotates the rotating body, wherein
the drive apparatus is the drive apparatus according to claim 7.

9. An encoder, comprising:
a scale that has a pattern and is mountable to a rotary member of an object to be measured;
a main body including a detector that detects the pattern, the main body being mountable to a non-rotating portion of the object to be measured; and
a holding member including:
an abutment portion that is removably provided to the main body from outside the main body and passes through the main body to abut the scale; and
a pushing portion that is capable of pushing the abutment portion toward the scale, wherein
the main body comprises a cover portion provided with a magnetic substance, and
the pushing portion comprises a magnet that is arranged at a part of the holding member located outside the main body and pushes the abutment portion toward the scale by magnetic force acting between the magnet and the magnetic substance.

10. An encoder, comprising:
a scale that has a pattern and is mountable to a rotary member of an object to be measured;
a main body including a detector that detects the pattern, the main body being mountable to a non-rotating portion of the object to be measured; and
a holding member including:
an abutment portion that is removably provided to the main body from outside the main body and passes through the main body to abut the scale; and
a pushing portion that is capable of pushing the abutment portion toward the scale, wherein
the scale is mounted with use of a second fixation member,
the holding member includes a guiding portion that guides the second fixation member to the scale from outside the holding member, and
the guiding portion is provided so as to allow an adjustment tool that adjusts a rotation position of the scale to be inserted in the guiding portion.

11. An encoder, comprising:
a scale that has a pattern and is mountable to a rotary member of an object to be measured;
a main body including a detector that detects the pattern, the main body being mountable to a non-rotating portion of the object to be measured;
a holding member including:
an abutment portion that is removably provided to the main body from outside the main body and passes through the main body to abut the scale; and
a pushing portion that is capable of pushing the abutment portion toward the scale; and
a scale movement restricting portion capable of restricting movement of the scale toward the non-rotating portion by the holding member.

12. A holding member to be used to mount an encoder that comprises:
a scale that has a pattern and is mountable to a rotary member of an object to be measured; and
a main body including a detector that detects the pattern, the main body being mountable to a non-rotating portion of the object to be measured,
the holding member comprising:
an abutment portion that is removably provided to the main body from outside the main body and passes through the main body to abut the scale such that the scale is capable of rotating with respect to the rotary member; and a pushing portion that is capable of pushing the abutment portion toward the scale.

13. A method of mounting an encoder that comprises:
a scale having a pattern; and
a main body including a detector that detects the pattern, the method comprising:
a first fixation step of fixing the main body to a non-rotating portion of an object to be measured by using a first fixation member;
an adjustment step of adjusting a position of the scale in a rotation direction with respect to a rotary member of the object to be measured, in a state in which a holding member including an abutment portion that abuts the scale and a pushing portion capable of pushing the abutment portion toward the scale is mounted to the main body from outside the main body; and
a second fixation step of fixing, after the rotation position is adjusted, the scale to the rotary member by using a second fixation member in a state in which the scale is held by the abutment portion pushed by the pushing portion.

14. The method of mounting an encoder according to claim 13, comprising mounting the holding member to the main body after the first fixation step and prior to the adjustment step.

15. The method of mounting an encoder according to claim 13, wherein the second fixation step comprises guiding the second fixation member to the scale from outside the scale by using a guiding portion provided to the holding member.

16. The method of mounting an encoder according to claim 15, wherein the second fixation step comprises guiding the second fixation member to the scale from outside the scale by using an inner wall portion of the abutment portion having a cylindrical shape as the guiding portion.

17. The method of mounting an encoder according to claim 13, wherein the adjustment step comprises inserting an adjustment tool that adjusts a rotation position of the scale into a guiding portion provided to the holding member.

18. The method of mounting an encoder according to claim 13, comprising removing the holding member after the second fixation step.

19. The method of mounting an encoder according to claim 13, wherein
the first fixation step, the adjustment step, and the second fixation step are performed in a state in which the rotary member is arranged lower than the non-rotating portion in a direction of gravity, and
the pushing portion pushes the abutment portion upward in the direction of gravity.

* * * * *